United States Patent
Paternoster

(10) Patent No.: US 10,981,322 B2
(45) Date of Patent: Apr. 20, 2021

(54) PROCESS FOR THE ACCELERATED PRODUCTION OF OBJECTS BY MEANS OF GENERATIVE MANUFACTURING

(71) Applicant: EOS GmbH Electro Optical Systems, Krailling (DE)

(72) Inventor: Stefan Paternoster, Andechs (DE)

(73) Assignee: EOS GmbH Electro Optical Systems, Krailling (DE)

( * ) Notice: Subject to any disclaimer, the term of this patent is extended or adjusted under 35 U.S.C. 154(b) by 635 days.

(21) Appl. No.: 15/037,109

(22) PCT Filed: Dec. 1, 2014

(86) PCT No.: PCT/EP2014/076150
§ 371 (c)(1),
(2) Date: May 17, 2016

(87) PCT Pub. No.: WO2015/082423
PCT Pub. Date: Jun. 11, 2015

(65) Prior Publication Data
US 2016/0279872 A1  Sep. 29, 2016

(30) Foreign Application Priority Data
Dec. 2, 2013 (DE) .......................... 102013224693.5

(51) Int. Cl.
*B29C 64/153* (2017.01)
*B29C 64/40* (2017.01)
(Continued)

(52) U.S. Cl.
CPC .......... *B29C 64/153* (2017.08); *B22F 3/1055* (2013.01); *B28B 1/001* (2013.01);
(Continued)

(58) Field of Classification Search
CPC ... B29C 64/135; B29C 64/153; B29C 64/171; B29C 64/176; B29C 64/386;
(Continued)

(56) References Cited

U.S. PATENT DOCUMENTS

| 5,530,221 A | 6/1996 | Benda et al. |
| 5,908,569 A | 6/1999 | Wilkening et al. |

(Continued)

FOREIGN PATENT DOCUMENTS

| CN | 102574204 A | 7/2012 |
| DE | 20 2009 012 628 U1 | 1/2010 |

(Continued)

OTHER PUBLICATIONS

PCT International Preliminary Report on Patentability, dated Jun. 7, 2016, 9 pages—English Translation.
(Continued)

*Primary Examiner* — Robert C Dye
*Assistant Examiner* — Sedef E Paquette
(74) *Attorney, Agent, or Firm* — Seyfarth Shaw LLP

(57) ABSTRACT

A process for 3D printing a material by successively solidifying layers of the material to form a cross section of an object. The process includes providing a layer of the material, preheating the material to a preheating temperature, below the temperature at which the material is solidified, and solidifying a layer of the material by electromagnetic radiation or particle radiation. In the solidification step, during a predetermined period of time starting with the beginning of the solidification step, the heat introduced per unit area is reduced over time and can be described by a function which decreases monotonously depending on the time.

14 Claims, 6 Drawing Sheets

(51) Int. Cl.
  *B22F 3/105* (2006.01)
  *B28B 1/00* (2006.01)
  *B28B 17/00* (2006.01)
  *B33Y 10/00* (2015.01)
  *B33Y 30/00* (2015.01)
  *B33Y 50/02* (2015.01)

(52) U.S. Cl.
  CPC .......... *B28B 17/0081* (2013.01); *B29C 64/40* (2017.08); *B33Y 10/00* (2014.12); *B33Y 30/00* (2014.12); *B33Y 50/02* (2014.12)

(58) Field of Classification Search
  CPC ..... B29C 64/40; B29C 64/141; B29C 64/268; B29C 64/273; B29C 65/16; B28B 17/0081; B28B 1/001; B33Y 50/02; B33Y 30/00; B33Y 10/00; B22F 3/1055; B23K 26/0626; C23C 24/10
  USPC .................. 264/497; 219/121.61; 419/54
  See application file for complete search history.

(56) References Cited

U.S. PATENT DOCUMENTS

| | | | | |
|---|---|---|---|---|
| 8,518,838 | B2* | 8/2013 | Carey | ............... H01L 21/26506 438/795 |
| 2003/0003636 | A1* | 1/2003 | Grigoropoulos | .... H01L 21/2026 438/149 |
| 2004/0254665 | A1 | 12/2004 | Fink | |
| 2006/0119012 | A1 | 6/2006 | Ruatta | |
| 2007/0196561 | A1 | 8/2007 | Philippi et al. | |
| 2012/0090734 | A1 | 4/2012 | Heinlein | |
| 2012/0107496 | A1* | 5/2012 | Thoma | .................. B29C 64/165 427/202 |
| 2013/0300035 | A1* | 11/2013 | Snis | ...................... B22F 3/1055 264/497 |
| 2014/0271328 | A1* | 9/2014 | Burris | .................. B23K 26/034 419/53 |

FOREIGN PATENT DOCUMENTS

| | | |
|---|---|---|
| EP | 0764079 B1 | 7/1998 |
| EP | 1486317 B1 | 8/2008 |
| EP | 1896246 B1 | 3/2010 |
| FR | 2878771 A1 | 9/2006 |
| WO | 2011018463 A1 | 2/2011 |
| WO | 2012102655 A1 | 8/2012 |

OTHER PUBLICATIONS

State Intellectual Property Office of the People's Republic of China First Office Action, dated May 2, 2017, 9 pages.

* cited by examiner

PROCESS FOR THE ACCELERATED PRODUCTION OF OBJECTS BY MEANS OF GENERATIVE MANUFACTURING

TECHNICAL FIELD OF THE INVENTION

The present invention refers to a method for a layer-wise manufacturing of three-dimensional objects by means of additive manufacturing and to a corresponding device. In particular, the present invention refers to a method and a device, in which the manufacturing time is reduced.

BACKGROUND OF THE INVENTION

Methods for a layer-wise additive manufacturing of three-dimensional objects are for example described in EP 1 486 317 B1. In case a powder is used as starting material for the manufacture, which powder is sintered and melted, respectively, by the introduction of heat energy, the building process usually proceeds such that a CAD model of the object to be manufactured is prepared, which model is dissected into layers, and subsequently the building material is solidified layer-wise corresponding to cross-sections of the CAD model.

For each powder layer the building process proceeds as follows:

After the application of a building material layer in powder form onto an already solidified layer, at first the newly applied powder layer is pre-heated by means of a radiative heating up to a working temperature below the temperature at which it is solidified. Thereupon, radiation (such as a laser beam) is directed onto the pre-heated layer for a selective solidification of the building material. After all layers of the object have been manufactured, the latter is allowed to cool down and the object is removed from the unsolidified powder that surrounds the object.

SUMMARY OF THE INVENTION

The production method described above is primarily used for a quick manufacturing of prototypes and models, respectively. The advantage of the method for the manufacturing of prototypes and models, respectively, is that the method allows the manufacturing of a large bandwidth of prototypes and models, respectively, without the need for manufacturing tools adapted to the type of the respective model to be manufactured, which tools have to be produced in advance with a high effort. Therefore, compared to a conventional method, the manufacturing of the prototype and model, respectively, may take place within a relatively short time. Therefore, also the term "rapid prototyping" is used for this type of method.

Due to the universality of an additive manufacturing method there are more and more considerations to apply such a method also to the series production of products. As compared for example to an injection molding method, one is no longer tied to the existence of a tool specifically adapted to the product to be manufactured, layer-wise additive manufacturing methods are in particular suitable for the manufacturing of small series or else even for the manufacturing of individually adapted products, because a variation of the product geometry and of the product properties is possible with a minimum effort. For this type of series production the term "rapid manufacturing" has become accepted.

For a series production of objects in particular two boundary conditions have to be fulfilled:

At first, one has to provide for a stable product quality. This is what EP 1 486 317 B1 does by building and measuring test specimens during the series production.

Furthermore, the manufacturing process has to be accelerated, because due to the sequential layer-wise construction an additive manufacturing method is prima facie slower than a conventional method such as an injection molding method. Here, there are already approaches to a process acceleration in EP 1 896 246 B1. In EP 1 896 246 B1 a swap container is presented, in which the object is manufactured and which can be removed from the manufacturing device after the termination of the manufacturing process, so that the cooling-down may occur outside of the manufacturing device and the manufacturing device is immediately again available for a new manufacturing process.

Albeit already by the process according to EP 1 896 246 B1 a remarkable acceleration of the manufacturing process may be achieved (the cooling-down process may last a few hours), by the device in EP 1 896 246 B1 the sequential layer-wise construction itself is not accelerated.

Therefore, an object of the invention is to provide a device and a method allowing a more rapid sequential layer-wise manufacturing of objects.

The object is achieved by a method according to claim 1 and a device according to claim 8. Further developments of the invention are given in the dependent claims.

The invention is based on the idea that the time necessary for a pre-heating of a freshly applied powder layer up to the working temperature can be reduced by making use of the fact that the powder layer can heat up further during the irradiation process. However, as the mechanical properties of the parts and their geometries will be influenced by the temperature of the powder layer at the time of exposure, when proceeding in such a way the heat energy introduced by the exposure has to be the larger the more the temperature of the powder layer at the time of exposure differs from the target pre-heating temperature (working temperature). If the powder material is too cool during the solidification, the solidification will be incomplete, leading for example to a reduction of the elongation at break of the objects perpendicular to the layers (in z-direction). Furthermore, for a pre-heating temperature that is too low, the dimensions of the parts are smaller than the nominal dimensions, because a smaller amount of the powder surrounding the object to be manufactured is solidified too in the peripheral region of the object.

BRIEF DESCRIPTION OF THE DRAWINGS

In the following, the invention will be described by embodiments using the attached drawings, of which.

DETAILED DESCRIPTION OF THE EMBODIMENTS

Figure 1:
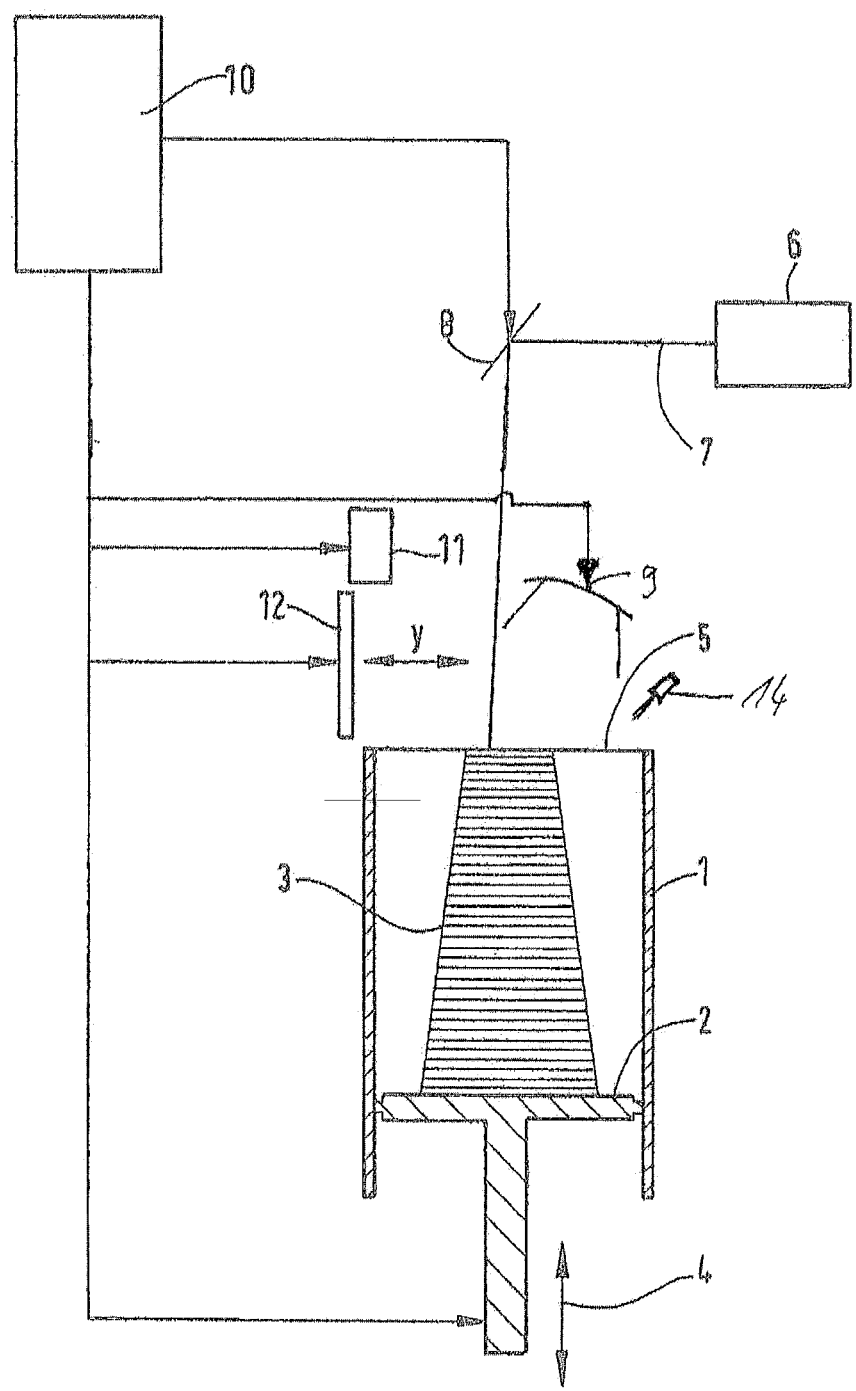
FIG. 1 shows a device for a layer-wise manufacturing of three-dimensional objects from a building material in powder form according to the invention.

At first, with reference to FIG. 1 the construction of a device according to the invention for manufacturing three-dimensional objects by means of an additive layer-wise manufacturing method is described.

As shown in FIG. 1, the object 3 to be manufactured is produced layer-wise on a building support 2. The building support 2 forms the bottom of a container open to the top, in which container the building process takes place and a frame 1 forms the sidewalls thereof. The building support 2 is connected to a lifting mechanism 4 that is able to move the building support in a vertical direction. With its upper end the frame 1 encloses a construction field 5, in which the solidification takes place. A recoater 11 for applying a layer of a powder material in the construction field is arranged above the construction field 5. Here, all powders that may be solidified by introduction of heat can be used as powder materials such as polymer powders, metal powders, ceramic powders or even also composite powders composed of different materials. Furthermore, fillers and/or additives may be added to the powders.

In addition, FIG. 1 shows schematically an application device 12 that can be moved in a horizontal direction and serves for smoothing an applied powder layer. Furthermore, an irradiation device consisting of a laser 6 is provided, which laser 6 generates a laser beam 7 that can be directed to arbitrary points in the construction field 5 by means of a deflection device 8. By the action of the laser beam 7 onto the powder material the powder material can be heated selectively in the construction field, so that as a result it becomes solidified at those positions that correspond to a cross-section of the object 3 to be manufactured.

Furthermore, the device according to the invention includes a heating device 9 above the construction field 5, which heats a newly applied powder layer up to a working temperature below a temperature at which the solidification of the powder material occurs. Preferably, the heating device (9) is a radiative heating (e.g. one or more radiant heaters) which is able to introduce heat energy in a large area of the newly applied powder layer by emitting electromagnetic radiation. Reference sign 10 designates a control device that is connected to the laser 6, the deflection device 8, the recoater 11, the application device 12 and the lifting mechanism 4 and which controls the building process. Not shown in FIG. 1 is a case that surrounds the frame 1, the lifting mechanism 4, the laser 6, the deflection device 8, the recoater 11 and the application device 12.

In the following, the course of an inventive process for a layer-wise additive construction of a three-dimensional object is described:

At first the building support 2 is moved by means of the lifting mechanism 4 to a position, at which the top side of the building support 2 or of a building platform arranged on it lies just under the upper edge of the frame 1. Then, the powder material applied by the recoater 11 is homogenously spread on the building support 2 or the building platform by means of the application device 12. Here, the vertical distance to the upper edge of the frame 1 that was set at the beginning defines the thickness of the applied layer. Then, a waiting time is introduced. Within such waiting time the applied powder layer is pre-heated by means of the heating device 9 up to a working temperature below a temperature, at which the building material is solidified by the action of the laser beam. Preferably, also the heating device 9 is connected to the control device 10. Preferably, the temperature of the pre-heated building material layer is controlled by a temperature measuring device 14. The temperature measuring device 14 may be a pyrometer, which measures the surface temperature of the applied layer in a region of the construction field 5, wherein the region, if possible, should lie outside of the object 3 during the whole construction of the object 3. As soon as the desired powder layer temperature has been reached, the powder layer is solidified by depositing heat energy by means of the laser beam in the region corresponding to the cross-section of the object. Thereupon, the building support 2 is lowered again by an amount corresponding to a layer thickness of the building material, building material is applied again, pre-heated, selectively solidified, etc. until the construction process of the object is complete.

According to the invention the solidification already starts before the applied powder layer has reached the desired working temperature. If e.g. the working temperature lies at approximately 175° C., according to the invention the solidification will be already started when the powder layer temperature lies still at approximately 2° C. below the working temperature. However, when proceeding as such, during a predetermined period from the start of the directing of the laser beam 7 onto the positions of the construction field 5 within the cross-section of the object more heat energy per unit area is introduced in order to compensate the powder layer temperature that is too low. In order to do so, the control device 10 varies the radiant flux and/or the deflection velocity of the laser beam 7 while the same sweeps over those positions of the construction field that correspond to the cross-section.

In the end, during a predetermined space of time that starts with the start of the solidification the heat energy per unit area introduced into the material by the laser beam 7 is continuously lowered as during the predetermined space of time the heating device 9 continuously introduces further heat energy into the powder layer. For example, the radiant flux $\varphi$ emitted by the laser 6 is reduced by and by following a given function f ($\varphi(t)=\varphi_0 \cdot f(t)$). Here, the function f(t) can explicitly be described by a polynomial or may be defined by function values f(t) stored in a table that change with time. Here, the time is the elapsed time since the start of the exposure process of a layer. The value $\varphi_0$ is a certain basic radiant flux, for which an arbitrary value may be chosen, because the size of f can be adapted to $\varphi_0$ (by multiplying f with a constant factor).

Then, after the predetermined period has elapsed, for the remaining duration of the exposure the heat energy introduced per unit area by the laser is kept constant, even if this need not necessarily be the case for the present invention.

The function that the heat introduction per unit area follows during the predetermined period may be determined empirically by pre-tests at parts or test specimen. In the following, a method is described for gaining such a function:

At first, objects (e.g. tensile rods according to ISO 527) are manufactured in an additive layer-wise manufacturing device (for example the device of FIG. 1) in a test run. In order to do so, e.g. groups of five tensile rods are manufactured such that the groups are exposed at different points in time from the start of the exposure of a layer. For example, a waiting time (e.g. 2 seconds) is inserted after the solidification process for one group before the next group is exposed. Here, the exposure process is started before the desired working temperature has been reached, which means like in the manufacturing process of the actual objects, e.g. already when the temperature measuring device 14 shows a value of e.g. approximately 2° C. below the desired working temperature.

In the pre-test one has to make sure that the temperatures of the test objects (e.g. groups of tensile rods) that are located at different positions in the construction space are not influenced by their positions in the construction space, for example for a peripheral position the heat dissipation to the surrounding of the construction space is higher than for a position in the center of the construction space.

After the construction of the parts the mechanical properties of the tensile rods are measured according to DIN 527-1 and DIN ISO 527-2 type 1B, wherein mean values are determined for each group. Due to the different times of exposure of the different groups of tensile rods in such a pre-test, the applied powder layer for the respective groups of tensile rods has been pre-heated to different temperatures when a solidification with the laser beam is carried out. By an analysis of the mechanical properties (such as the elongation at break in z) and of the geometry (such as the cross-sectional area of the z-tensile rods) in dependence of the time, the influence of the pre-heating temperature onto the mechanical properties and onto the geometry of the objects to be manufactured is obtained.

Figure 2:
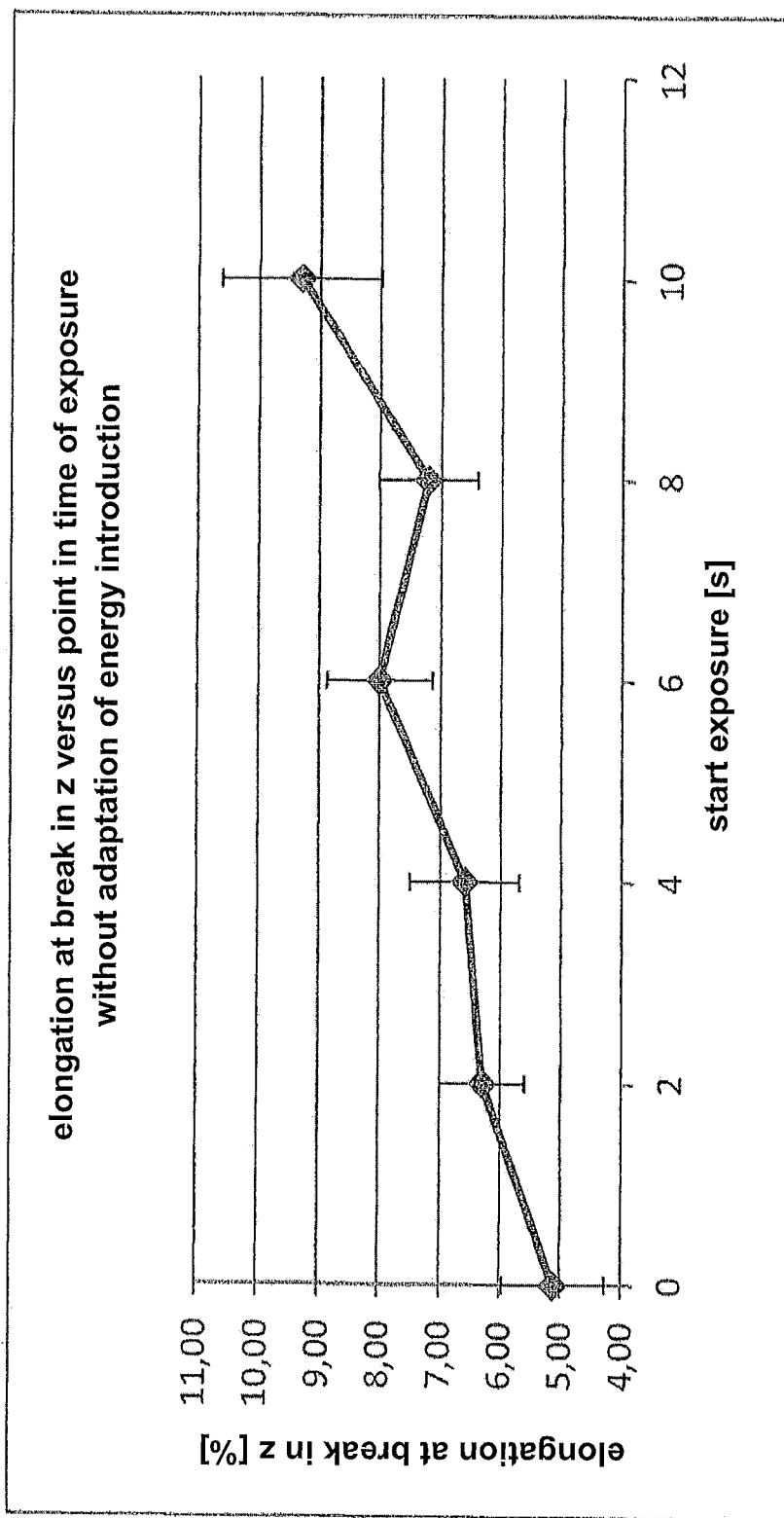
FIG. 2 shows a graph illustrating the progression of the elongation at break in z with the time of exposure for a pre-test with z-tensile bars.
Figure 3:
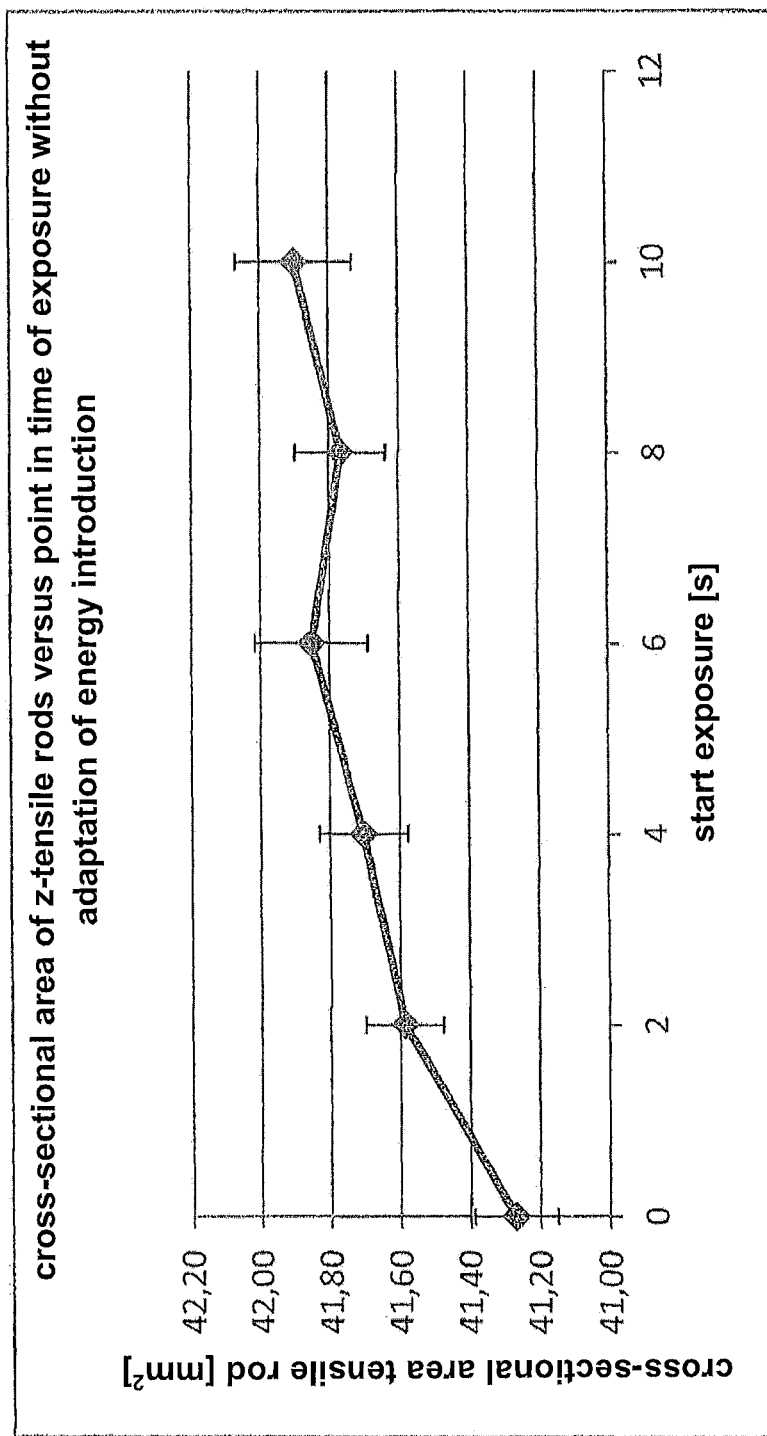
FIG. 3 shows a graph illustrating the dependence of the cross-sectional area on the time of exposure for a pre-test with z-tensile bars according to DIN ISO 527-1 and DIN ISO 527-2 type 1B.
Figure 4:
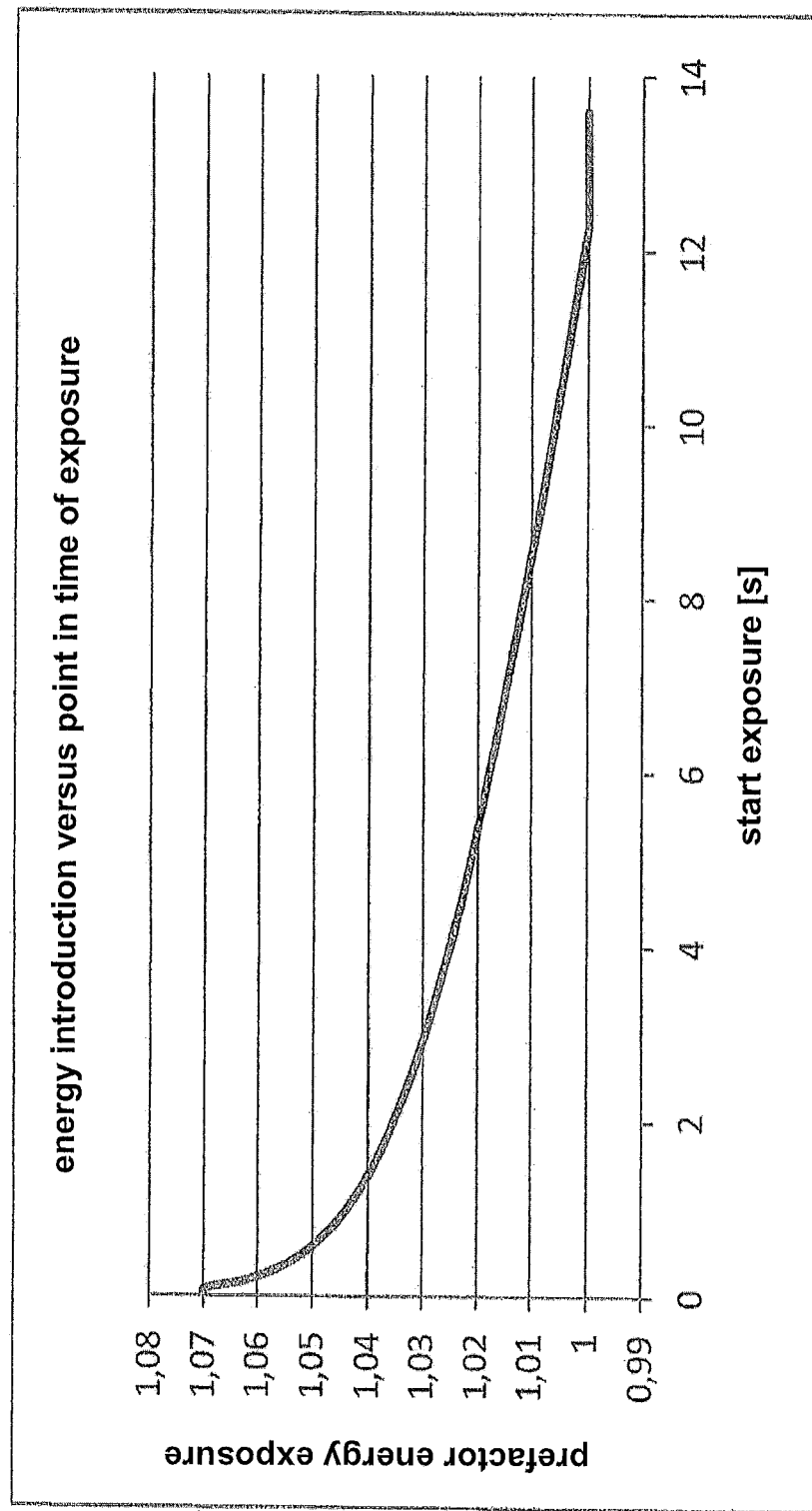
FIG. 4 shows a graph illustrating the temporal dependence of a pre-factor, by which the luminous flux emitted by the laser in a period from the start of the exposure of a layer has to be multiplied.

FIGS. 2 and 3 show the respective curve progressions for the elongation at break in z and the cross-sectional area, which were determined in an exemplary pre-test. According to the invention, based on such a pre-test an exposure parameter such as the emitted radiant flux is determined for individual points in time during a predetermined period from the start of the exposure and such exposure parameters are stored in a table. For example, assuming a value of 1 for the emitted radiant flux $\varphi_0$ after the predetermined period has elapsed, a prefactor (function value f(t)) can be stored in the table for the predetermined period, by which pre-factor such emitted radiant flux $\varphi_0$ has to be multiplied during the predetermined period. FIG. 4 shows the dependence of such a prefactor on time.

Figure 5:
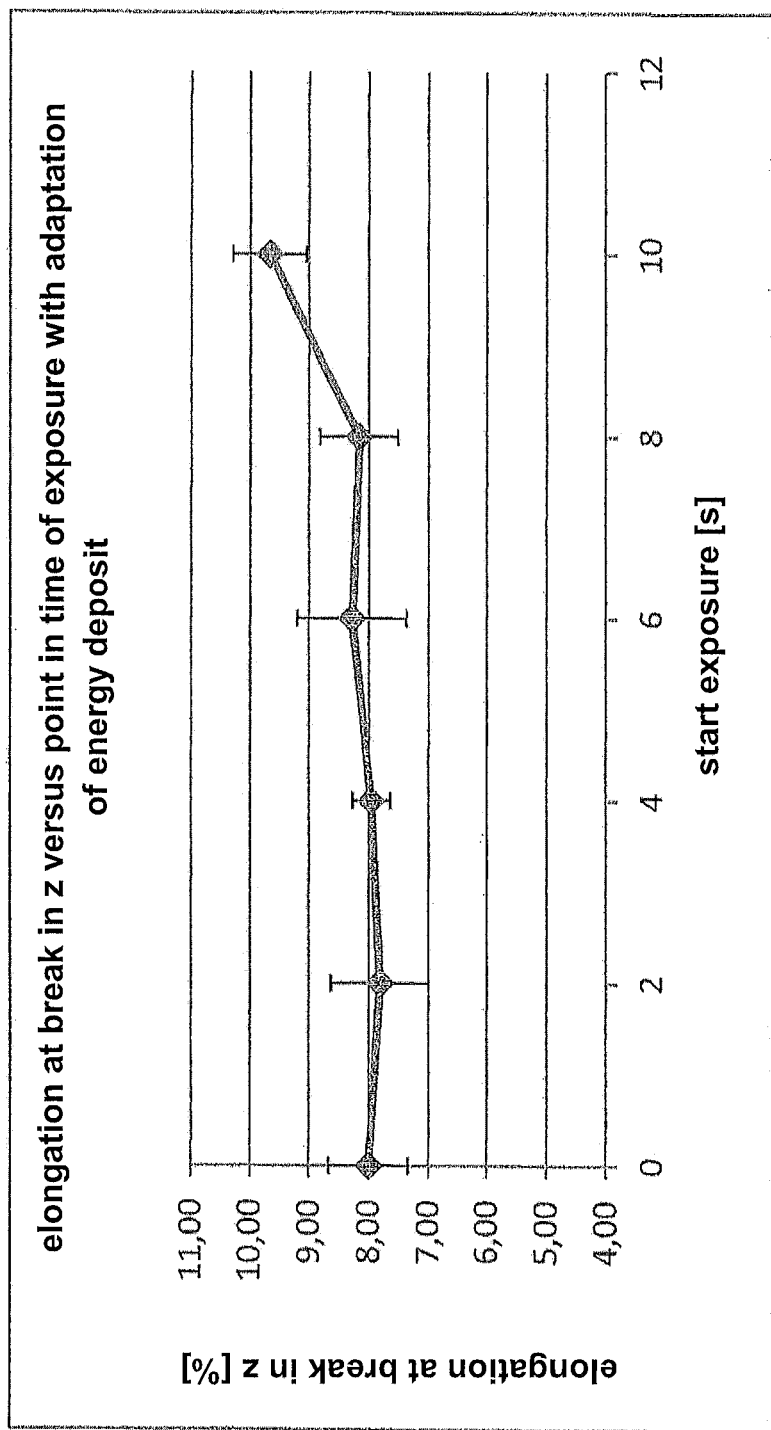
FIG. 5 shows a graph that illustrates the progression of the z elongation at break in dependence on the time of exposure for a test run with z-tensile bars, for which z-tensile bars the luminous flux emitted by the laser had been reduced by and by during a period of twelve seconds from the start of the exposure.
Figure 6:
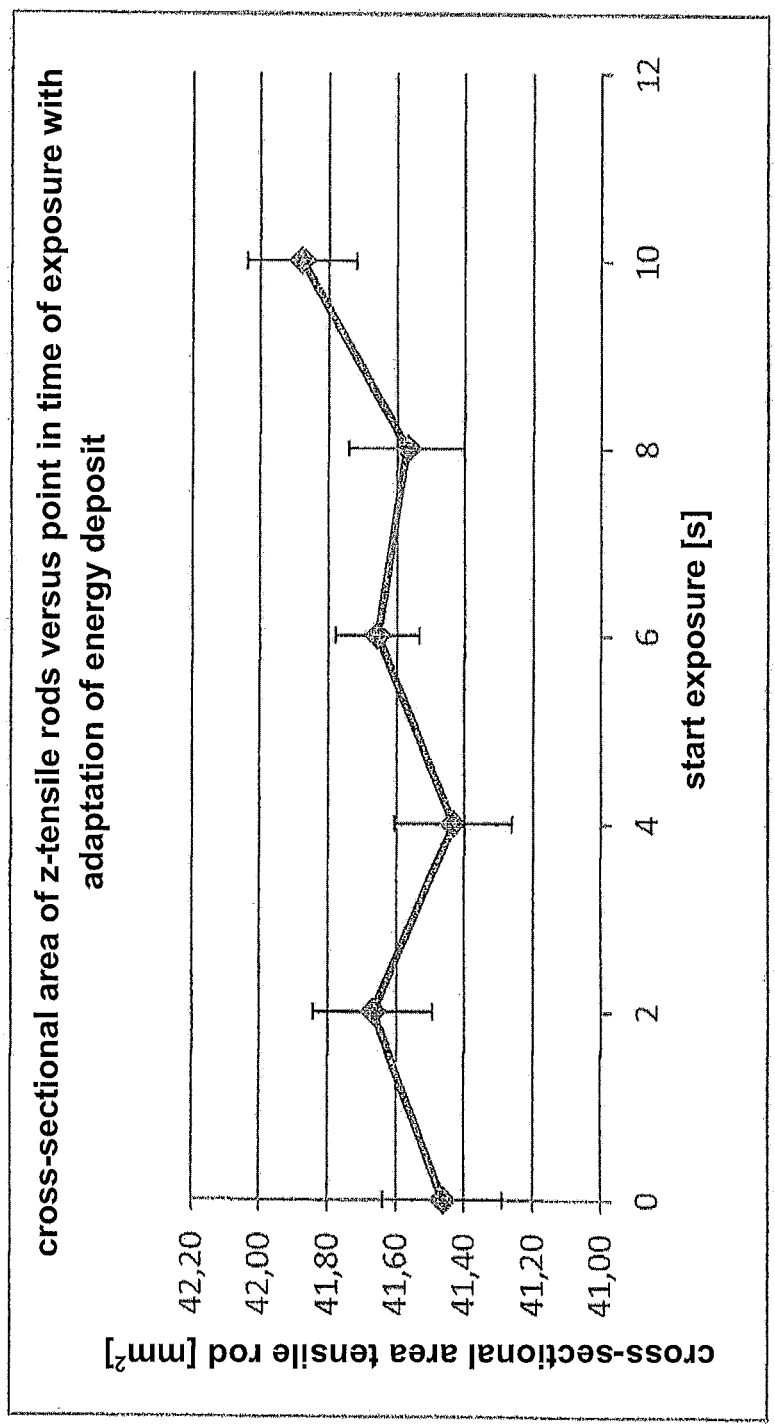
FIG. 6 shows a graph illustrating the dependence of the cross-sectional area on the time of exposure for a test run with z-tensile bars, for which z-tensile bars the luminous flux emitted by the laser had been reduced by and by during a period of twelve seconds from the start of the exposure.

Based on the values in the table now the emitted radiant flux during the predetermined period may then either be reduced in steps or a monotonically decreasing function f(t) is fitted to the values in the table. FIGS. 5 and 6 show the elongation at break in z and the cross-sectional area for a test run with z-tensile rods, for which (at otherwise identical building parameters) the emitted radiant flux was reduced by and by during a period of 12 seconds from the start of the exposure. When compared to FIGS. 2 and 3, it can be seen that for the elongation at break in z and for the cross-sectional area nearly constant values are obtained independent from the time of exposure.

Of course one could try determining the heat energy to be introduced per unit area at the start of the exposure period by means of a theoretical function. However, the heat energy to be introduced depends on the powder material and furthermore will also be determined by the type and arrangement of the heating device 9. Therefore, it is most advantageous to determine function values by means of the described pre-test.

Here, which types of parts should be used for the pre-tests depends on the properties that are most important for the object that shall actually be produced.

For the pre-tests not necessarily z-tensile rods need to be used. Alternatively, the tests could also be carried out with the object that shall actually be produced. As a series production is carried out after the pre-tests, the effort for pre-tests is acceptable in view of the possible time that may be saved thereby in the series production.

It shall also be emphasized that the heat energy to be introduced per unit area at the start of the exposure period for a layer may also be determined by pre-tests, in which not the influence of the powder pre-heating temperature onto the mechanical properties and onto the geometry of the pre-test parts is determined, but rather the influence of the powder pre-heating temperature onto another property of the pre-test parts such as the surface quality is determined.

The heat energy per unit area introduced into the building material for a solidification of the same need not necessarily be varied by a variation of the emitted radiant flux. Here, also alternative approaches are possible:

The energy introduced per unit area can also be varied by varying the velocity with which the laser sweeps over the construction field 5. The faster the laser beam moves across the construction field 5 the lower the heat energy per unit time that is introduced into the building material. Thus, for reducing gradually the heat energy that is introduced per unit area, it is possible to move the laser beam at the start of the predetermined period with a lower velocity over the construction field 5 than after the elapse of the predetermined period. Furthermore, the heat energy introduced per unit area also depends on the distance of neighboring beam paths of the laser beam sweeping across the construction field. This means that a gradual reduction of the heat energy introduced per unit area into the material can also be achieved by gradually increasing the distance of neighboring paths of the laser beam 7.

Furthermore, it shall be emphasized that the emitted radiant flux for a pulsed operation may also be varied by changing the frequency or the duty factor.

In all described cases the control device 10 adjusts the respective parameters in dependence of the time.

In case in a series production of the objects one proceeds such that the contour of a respective cross-section of the object and the inside of the cross-section are solidified separately, the adaptation of the heat energy introduced per unit area described above has to be respectively applied to the exposure of the contour and the exposure of the inside of the cross-section, depending on whether the contour or the inside of the cross-section are exposed first.

In a further development of the method according to the invention not only the heat energy introduced per unit area is varied. Rather, during the predetermined period the "beam offset" is adapted too. The beam offset denotes an amount, by which the laser beam is shifted inwards at the contour of the object in order to take into account a.o. that due to heat conduction the powder immediately outside of the region to be solidified is solidified too, whereby the object dimensions change. Accordingly, at the start of the exposure period a smaller beam offset is set and this beam offset is gradually increased during the predetermined period.

The length of the predetermined period, during which the heat energy introduced per unit area is reduced by and by or the beam offset is increased by and by can be determined by means of the described pre-tests. As soon as the mechanical properties that have been determined by the pre-tests and/or the object dimensions in the pre-tests lie within a range of tolerance defined for the object to be manufactured in a series production, a variation of the exposure parameters is no longer necessary. Thus, it is possible to determine by the pre-tests that point in time from the start of the exposure, at which the properties lie within the range of tolerance. Such point in time then defines the end of the predetermined period. As experience has shown, the predetermined period lies in a range from 1 to 15 seconds. However, in particular for large layer thicknesses also longer periods are possible.

Though in the above always a solidification of the building material by means of a laser beam was mentioned, the present invention is not limited to this type of introduction of heat energy. The heat energy necessary for a solidification can in the same way be introduced areally. Therefore, the region of incidence onto the powder layer of the radiation used for the solidification of the material can generally be termed "solidification radiation incidence region". The invention will always lead to an advantageous acceleration of the building process in cases, in which not all positions of the cross-section of the object are simultaneously solidified, but different positions of the object cross-section are solidified at different points in time. In the same way, the present invention is not limited to the use of electromagnetic radiation. Rather, it can be implemented in the same way in conjunction with particle radiation for introducing heat energy into the building material. Finally, the present invention includes methods, in which the building material is completely melted as well as methods, in which a sintering occurs, wherein the powder particles are only melted at their surfaces.

The invention claimed is:

1. A method for layer-wise construction of a three-dimensional object from a building material by solidification of consecutive layers of the building material at positions of a layer corresponding to a cross-section of an object in that layer, wherein the solidification is effected by a heat energy directed to impinge on a build surface of the building material, the method comprising the following steps:
providing a layer of the building material initially on a building support and thereafter on a prior layer that has been previously solidified at selected positions;
pre-heating the building material by means of a heating device that supplies heat energy for pre-heating of the building material layer to a working temperature which is below a temperature at which the material is to be solidified by a solidification energy beam;
solidifying the layer by the solidification energy beam directed to pass over all positions of the layer corresponding to the cross-section of the object so that the building material is solidified by an additional heat energy introduced by the solidification energy beam, wherein, while the solidification energy beam is moving over the positions of the layer in a single pass, the additional heat energy introduced per unit area by the solidification energy beam is continuously reduced with time during a predetermined period, a start of the predetermined period coinciding with a time at which the solidification energy beam for a first time impinges on the layer, wherein during the predetermined period the heating device continues to supply the heat energy to the build surface.

2. The method of claim 1, wherein the additional heat energy introduced per unit area reduces with time as a function monotonically decreasing with time during the predetermined period.

3. The method of claim 1, wherein the heat energy has a radiant flux, and the additional heat energy introduced per unit area is reduced by reducing the radiant flux inside of a solidification energy beam incidence region while the solidification energy beam incidence region is passing over the build material.

4. The method of claim 1, wherein the solidification energy beam has a velocity during a pass, the additional heat energy introduced per unit area being reduced by an increase of the velocity with which a solidification energy beam incidence region is passing over the build material.

5. The method of claim 2, wherein the solidification energy beam is from a laser source.

6. The method of claim 2, wherein the function monotonically decreasing with time is defined by a polynomial or is defined by function values in a table that change with time.

7. The method of claim 2, wherein the function monotonically decreasing with time comprises the following steps:
manufacturing a plurality of different objects or a plurality of different test specimens by the method for layer-wise construction, wherein cross-sections of the different objects or of the different test specimens in a layer are solidified at different points in time from the start of the impingement of the solidification energy beam on the layer;
determining a property of each of the different objects or each of the different test specimens after the end of the step of manufacturing; and
determining the function monotonically decreasing with time and a length of the predetermined period based on the determined property of the different objects or the different test specimens.

8. The method of claim 7, wherein the property determined at each of the different objects or each of the different test specimens is a mechanical property, a dimension, or a parameter for describing a surface quality of the different objects or each of the different test specimens.

9. The method of claim 1, wherein the step of solidifying begins before an end of the step of pre-heating.

10. A method for layer-wise construction of a three-dimensional object from a building material by solidification of consecutive layers of the building material at positions of a layer corresponding to a cross-section of an object in that layer, wherein the solidification is effected by an additional heat energy directed to impinge on a build surface containing building material, the method comprising the following steps:
providing a layer of the building material initially on a building support and thereafter on a prior layer that has been previously solidified at selected positions;
pre-heating the building material up to a working temperature below a temperature at which the material is to be finally solidified, the pre-heating being by means of a heating device that is able to supply heat energy to an area of the building material layer;
solidifying the layer by the additional heat energy wherein a solidification energy beam is directed to pass over all positions of the layer corresponding to the cross-section of the object so that the building material is solidified by the additional heat energy introduced by the solidification energy beam, wherein the solidification step begins before the building material reaches the working temperature, wherein the additional heat energy introduced per unit area at a start of an impingement of the solidification energy beam on the building material is sufficient to raise a temperature of the building material above the working temperature up to a point where the building material begins to melt or fuse and wherein, while the solidification energy beam is moving over all positions of the layer corresponding to the cross-section in a single pass, the additional heat energy introduced per unit area by the solidification energy beam is continuously reduced with time during a predetermined period, a start of the predetermined period coinciding with a time at which the solidification energy beam for a first time impinges on the layer during which predetermined period the heating device continues to supply heat energy to the build surface.

11. A method for layer-wise construction of a three-dimensional object from a powder building material by solidification of consecutive layers of the building material at positions of a layer each corresponding to a discrete cross-section of that object in that layer, comprising the following steps:
  providing a layer of the building material initially on a building support and thereafter on a prior layer that has been previously solidified at selected positions;
  providing a pre-heating device that supplies a first heat energy to an area of the building material layer;
  pre-heating the building material using the first heat energy up to a working temperature which is below a temperature at which the material is to be melted and then solidified;
  melting and then solidifying the layer by application of a directed second additional heat energy which is directed to positions of the layer corresponding to a respective cross-section of the object so that the building material is melted by the additional heat energy, melting being initiated before the building material reaches the working temperature, with the additional heat energy introduced per unit area at a start of an impingement of an additional heat energy beam on the building material to raise a temperature of the building material subject to the combination of first and additional heat energy to a point where the building material begins to melt or fuse, and wherein, while the additional heat energy beam is moving over positions of the layer corresponding to the cross-section in a single pass, the additional heat energy introduced per unit area by the additional heat energy beam is continuously reduced with time during a predetermined period, a start of the predetermined period coinciding with a time at which the additional heat energy beam starts impingement;
  continuing the first heat energy to supply heat energy to the build surface during the predetermined period; and
  allowing at least some solidification of each layer before building a next layer.

12. The method of claim 11, wherein the additional heat energy introduced per unit area reduces with time as a function monotonically decreasing with time during the predetermined period.

13. The method of claim 12, wherein the additional heat energy beam has a radiant flux, and the heat energy introduced per unit area is reduced by reducing the radiant flux inside of an additional heat energy beam incidence region while the additional heat energy beam incidence region is passing over the build material.

14. The method of claim 13, wherein the additional heat energy beam has a velocity during a pass, the additional heat energy introduced per unit area being reduced by an increase of the velocity with which the additional heat energy beam is passing over the build material.

* * * * *